US011443477B2

(12) United States Patent
Guan

(10) Patent No.: US 11,443,477 B2
(45) Date of Patent: Sep. 13, 2022

(54) METHODS AND SYSTEMS FOR GENERATING A VOLUMETRIC TWO-DIMENSIONAL REPRESENTATION OF A THREE-DIMENSIONAL OBJECT

(71) Applicant: Verizon Patent and Licensing Inc., Basking Ridge, NJ (US)

(72) Inventor: Garry Guan, Belleville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/112,333

(22) Filed: Dec. 4, 2020

(65) Prior Publication Data

US 2022/0180594 A1  Jun. 9, 2022

(51) Int. Cl.
*G06T 17/00* (2006.01)
*G06T 15/08* (2011.01)
*G06T 7/00* (2017.01)

(52) U.S. Cl.
CPC ............ *G06T 15/08* (2013.01); *G06T 7/0002* (2013.01); *G06T 17/00* (2013.01); *G06T 2207/20081* (2013.01); *G06T 2207/30168* (2013.01)

(58) Field of Classification Search
CPC ........ G06T 17/00; G06T 9/001; H04N 19/597
See application file for complete search history.

(56) References Cited

U.S. PATENT DOCUMENTS

| | | | |
|---|---|---|---|
| 2015/0154786 A1* | 6/2015 | Furukawa | G06T 15/30 345/419 |
| 2020/0302632 A1* | 9/2020 | Oh | H04N 19/597 |
| 2020/0380765 A1* | 12/2020 | Thudor | G06T 17/10 |
| 2021/0158554 A1* | 5/2021 | Asawaroengchai | G06T 7/11 |

\* cited by examiner

*Primary Examiner* — Ryan McCulley

(57) ABSTRACT

An illustrative image processing system identifies a component of a three-dimensional (3D) object that is to be presented to a user. The image processing system then generates a set of two-dimensional (2D) images depicting the component of the 3D object from a set of vantage points tailored to the component. The image processing system incorporates one or more 2D images of this set of 2D images within a 2D atlas image associated with the 3D object. The image processing system provides the 2D atlas image to a volumetric rendering device configured to render, based on the 2D atlas image, a volumetric representation of the 3D object for presentation to the user. Corresponding methods and systems are also disclosed.

20 Claims, 9 Drawing Sheets

METHODS AND SYSTEMS FOR GENERATING A VOLUMETRIC TWO-DIMENSIONAL REPRESENTATION OF A THREE-DIMENSIONAL OBJECT

BACKGROUND INFORMATION

Various applications make use of volumetric representations (e.g., volumetric models, etc.) of three-dimensional ("3D") objects. As one example application, volumetric representations of 3D objects within a scene may be used in a representation of the scene and/or the objects that viewers may experience in various ways. For instance, an extended reality device (e.g., a virtual reality, augmented reality, or other such device) may present a representation of the scene and/or the objects to be experienced by one or more users by way of extended reality technologies such as virtual reality, augmented reality, and/or other such technologies. In some examples, extended reality content may be generated in real time to allow users to experience live events (e.g., sporting events, concerts, news events, celebratory events, etc.) occurring at the scene. In other examples, extended reality content may be generated and stored for experiencing in a time-shifted manner.

In other example applications, volumetric representations of 3D objects may be useful for generating media content such as video game content, movie special effects, television sports and news effects, and so forth. Additionally, volumetric representations of 3D objects may be useful in various other applications including security applications (in which security cameras locate and/or track people and objects within a secured space), computer-aided design applications (in which 3D models are scanned for 3D printing and/or other purposes), computer vision applications (in which information about 3D objects is extracted to implement autonomous processes based on the information), and/or various other entertainment, educational, industrial, commercial, vocational, promotional, and/or other suitable applications and use cases.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
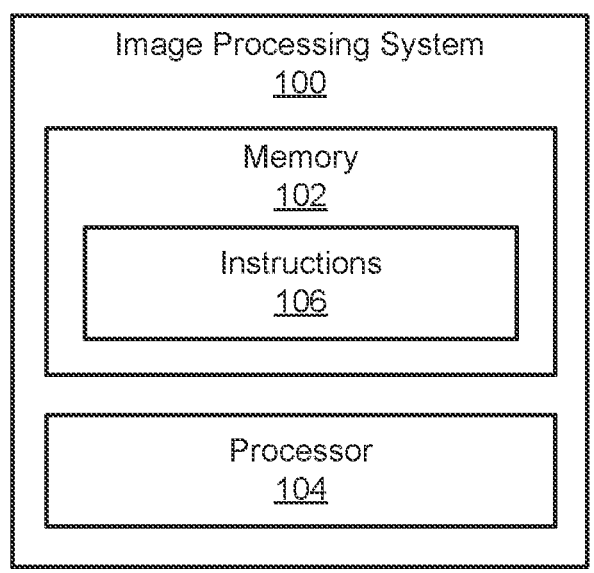
FIG. 1 shows an illustrative image processing system configured to generate a volumetric two-dimensional ("2D") representation of a three-dimensional ("3D") object according to embodiments described herein.

Methods and systems for generating a volumetric two-dimensional ("2D") representation of a three-dimensional ("3D") object are described herein. As described above, data representative of volumetric representations of 3D objects may be used in various types of applications and use cases. In some of these applications and use cases, a system or device that presents the 3D object to an end user (e.g., a volumetric rendering device such as a media player device configured to present extended reality content, etc.) may be independent and/or separate from (e.g., geographically remote from) one or more systems or devices that capture, process, and/or generate content from which the volumetric representation is to be rendered. As such, data representative of the volumetric representation may be transmitted between different systems, stored by one system for later use by another system, or the like. Systems and methods described herein may therefore generate volumetric 2D representations of 3D objects to allow this volumetric representation data to be efficiently and effectively communicated, stored, processed, and so forth.

As used herein, a "2D representation" of a 3D object may refer to any image, sequence of images (e.g., video image), or the like, that depicts or otherwise represents a 3D object using a two-dimensional matrix of pixels corresponding to color properties of the 3D object (a color image of the 3D object), depth properties of the 3D object (a depth image of the 3D object), or other such properties of the 3D object. For example, a photograph or video capture of a 3D object such as a person may be referred to as a "2D representation" of the person. As used herein, a "volumetric 2D representation" refers to a specific type of 2D representation that is not embodied by a single photograph or video capture in and of itself. More particularly, a volumetric 2D representation of a 3D object, as used herein, will be understood to refer to a 2D representation that includes enough information for a volumetric model of the 3D object to be constructed or rendered based on the volumetric 2D representation. For example, as will be described and illustrated in more detail below, a volumetric 2D representation of a 3D object may be implemented by one or more 2D atlas images that each incorporate several color and/or depth images of the 3D object (e.g., from several different vantage points with respect to the 3D object) such that a volumetric representation of the 3D object can be rendered based on the one or more 2D atlas images.

Methods and systems described herein provide efficient and effective ways of generating volumetric 2D representations of 3D objects in various ways. For example, by segmenting 3D objects of recognized object types in real time (e.g., based on machine learning models or other technologies configured to leverage prior knowledge of the recognized object types), methods and systems described herein may automate and enhance the packaging of data depicting the 3D objects based on different components of the 3D objects as the components have been differentiated during the segmentation process. This may result in high quality and efficient 2D representations that can be transmitted, stored, and/or otherwise processed and handled using 2D image data encoders, compressors, transmission protocols, storage protocols, and so forth.

Various advantages and benefits may be provided by methods and systems described herein. For example, a pipeline of computing devices or systems configured to produce volumetric content may be more efficient, reliable, maintainable, and otherwise optimized during both development and deployment stages when volumetric models can be effectively represented using 2D image data rather than 3D volumetric data (e.g., geometric data representative of volumetric meshes, texture data and metadata indicative of how the texture data is to be applied to the meshes, etc.). 2D image data such as is implemented by volumetric 2D representations of 3D objects described herein may be more readily transmittable (e.g., using established encoding and compression technologies that have been established for 2D video data), more efficiently storable and processable, and so forth. Accordingly, efficiency benefits may arise whether the 2D image data is being passed from one device to another in a content generation pipeline or is being provided from a server-side computing system to a client-side end user device (e.g., a media player device configured to render and present a volumetric 3D representation based on the volumetric 2D representation).

Another advantage of image processing methods and systems described herein is that 2D image data included in volumetric 2D representations of 3D objects may be selected in careful and deliberate ways that help optimize the 2D image data to efficiently and effectively represent the 3D objects. For example, the vantage points used to generate various 2D images incorporated into a volumetric 2D representation may be selected in highly optimized ways (e.g., on a component-by-component basis, based on intelligent segmentation of known types of 3D objects) so as to provide higher quality models per unit of data (e.g., due to reduced redundancy, more optimal use of depth resolution, etc.) than would be provided if vantage points were not so carefully selected (e.g., if vantage points were placed in a sphere around a non-spherical 3D object such as a human body object, etc.).

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein for generating a volumetric 2D representation of a 3D object may provide any of the benefits mentioned above, as well as various additional and/or alternative benefits that will be described and/or made apparent below.

FIG. 1 shows an illustrative image processing system 100 ("system 100") configured to generate a volumetric 2D representation of a 3D object in accordance with principles described herein. System 100 may be implemented by computer resources such as server systems or other computing devices that include processors, memory facilities, storage facilities, communication interfaces, and so forth. For example, system 100 may be implemented by computing systems such as local computing systems operated by a user, distributed computing systems operated by a communications provider (e.g., multi-access edge computing ("MEC") servers), distributed computing systems operated by a cloud-computing provider (e.g., multi-access cloud servers), or any other suitable computing system or systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with generating a volumetric 2D representation of a 3D object as described herein and/or as may serve a particular implementation.

Figure 2:
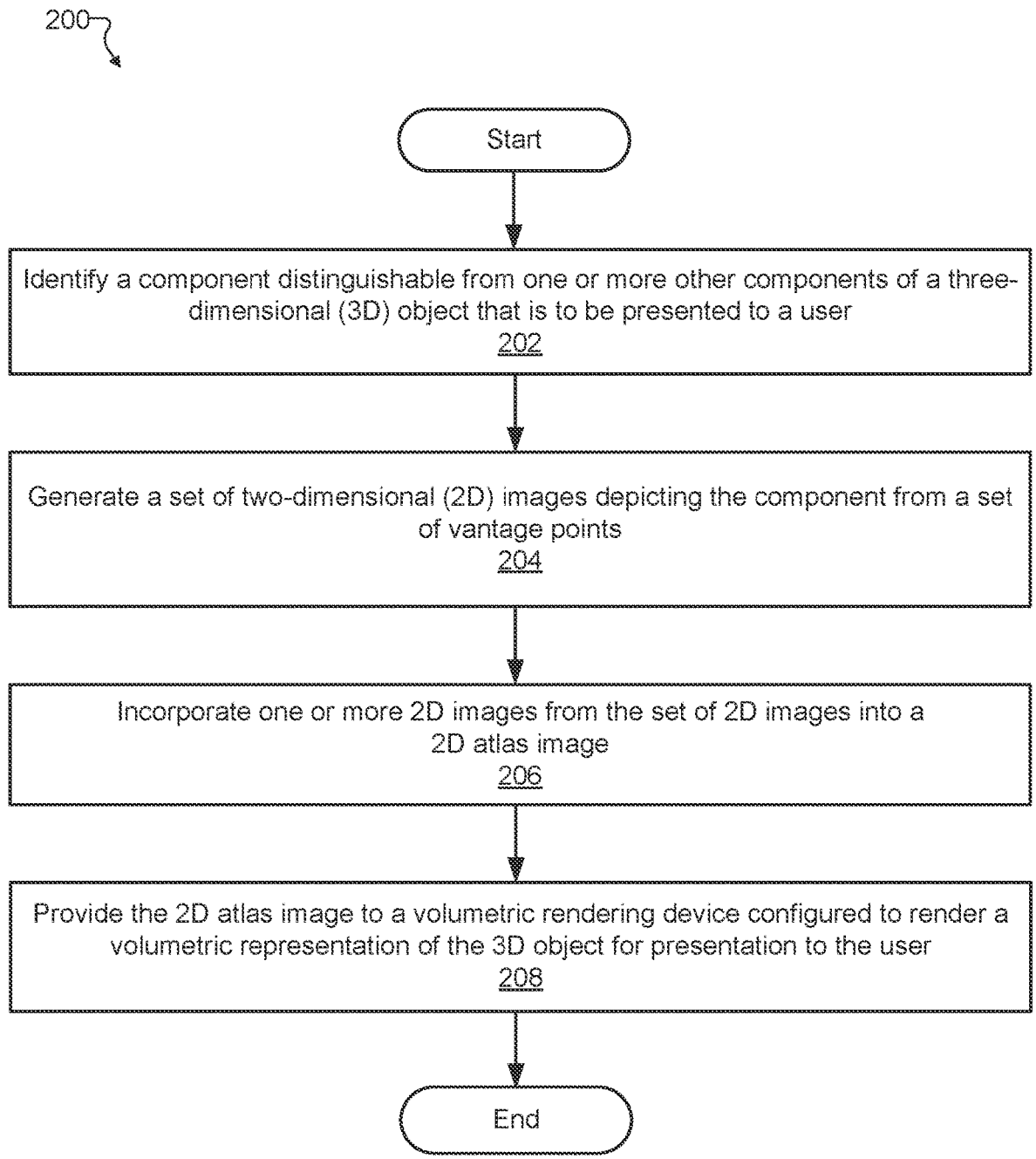
FIG. 2 shows an illustrative method for generating a volumetric 2D representation of a 3D object according to embodiments described herein.

As one example of functionality that processor 104 may perform, FIG. 2 shows an illustrative method 200 for generating a volumetric 2D representation of a 3D object in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an image processing system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by system 100 (e.g., by processor 104 as processor 104 executes instructions 106 stored in memory 102).

At operation 202, system 100 may identify a component of a 3D object that is to be presented to a user. The component of the 3D object may be distinguishable from one or more other components of the 3D object, particularly, for instance, when the 3D object is of a recognized object type (e.g., a known object type for which system 100 may access a machine learning model that assists system 100 in properly analyzing the object even as the object is posed in different ways, viewed from different perspectives, etc.). As one example, if the 3D object is a person (also referred to herein as a "human body object") for which a trained machine learning model is available, a left hand component of the human body object may be distinguishable from other components such as a left arm, a right hand, a right arm, a head, a torso, and so forth.

In some examples, the identifying of operation 202 may include both distinguishing the component from the other components (e.g., determining that the component is distinct from the other components in a manner that allows it to be treated as a sub-object separate from the other components) as well as recognizing a component type of the component (e.g., that it is a left hand, etc.). For instance, this type of identifying may be performed as part of a process of segmenting the 3D object using the machine learning model or other preconfigured models or data that system 100 may access to gain insight into the 3D object or object type.

In other examples, the identifying of the component at operation 202 may include the distinguishing of the component from the other components (e.g., as well as segmenting, labeling, and/or otherwise differentiating the components) while not necessarily including the recognition or labeling of the component as a particular type of recognized component for which system 100 has prior knowledge. For instance, even in examples where no machine learning model or other data providing predetermined intelligence or insight about an object type is available, the nature of the object may be such that system 100 can reliably distinguish one component of the 3D object from other components such that the identifying of operation 202 is still suitably performed and the component is identified as being a part of the 3D object that is separate and distinguishable from other parts of the 3D object.

At operation 204, system 100 may generate a set of 2D images depicting the component of the 3D object from a set of vantage points tailored to the component. For example, a color image and a depth image may be generated for each vantage point in the set of vantage points and these may be included (e.g., along with other color images and depth images corresponding to different vantage points for this same component) in the set of 2D images.

As will be described and illustrated in more detail below, the set of vantage points may be tailored to the component in a manner that allows the component to be efficiently represented (e.g., with minimal or no redundancy with other components, without background data that would be excluded from the final volumetric representation that is to be rendered, etc.) from various different viewpoints or perspectives. For instance, in one implementation, the component may be tightly encapsulated within a virtual bounding box (e.g., a rectangular prism having six faces that is configured to as to fit relatively tightly around the identified component of the 3D object), and the set of vantage points may include six orthographic vantage points associated with the six faces of the virtual bounding box.

In other examples, the set of vantage points may be tailored to the component in other suitable ways based on attributes such as the geometry of the component (e.g., a very thin object such as a piece of paper may need to be represented only from front and back and not the four other sides), the relative importance of the component as compared to the other components of the 3D object (e.g., a face of a person may be more important to render in a detailed and accurate way than a foot of the person due to how the model of the person is likely to be viewed by the end user), and so forth. For instance, a set of vantage points with more or fewer vantage points configured in the same or different ways as the bounding box example described above may be employed as may serve a particular implementation.

At operation 206, system 100 may incorporate, within a 2D atlas image associated with the 3D object, one or more of the 2D images from the set of 2D images generated at operation 204. For example, as will be described in more detail below, several of the 2D images from the 2D image set described above may be determined to include valid image data that would be usable for rendering a volumetric representation of the 3D object, and may thus be added to the 2D atlas image. In contrast, if there are 2D images in the set that are determined to not include valid or useful image data, these 2D images may be excluded from (i.e., not integrated within) the 2D atlas image. In certain examples, the 2D atlas image may include a collection of dozens or hundreds of individual 2D images and may serve as a single frame in a frame sequence of similar 2D atlas images corresponding to other points in time.

The 2D atlas image generated at operation 206 may be related to a volumetric 2D representation of a 3D object in several different ways. For example, the 2D atlas image may be implemented (e.g., together with other 2D atlas images) within a volumetric 2D representation if the 2D atlas image includes 2D images (e.g., color and/or depth images) from just the set of 2D images that corresponds to the component identified at operation 202. As another example, the 2D atlas image may implement the volumetric 2D representation if the 2D atlas image further includes 2D images from other sets of 2D images corresponding to other components of the 3D object such that the 2D atlas image may serve as a complete volumetric 2D representation of the 3D object. As yet another example, the 2D atlas image may include a plurality of volumetric 2D representations if the 2D atlas image further includes 2D images associated with one or more 3D objects other than the 3D object that has been described. For instance, a scene that includes several objects (e.g., several different people) that are each segmented into respective components each represented by respective sets of 2D images may all be represented in a single 2D atlas image.

At operation 208, system 100 may provide the 2D atlas image described above in relation to operation 206 to a volumetric rendering device. The volumetric rendering device may be configured to render, based on the 2D atlas image, a volumetric representation of the 3D object for presentation to the user. For example, the volumetric rendering device may be a downstream (but still server-side) rendering engine configured to render the volumetric representation as part of the content creation process. As another example, the volumetric rendering device may be a client-side rendering device such as a media player device used by an end user to experience the volumetric representation. For instance, as will be described in more detail below, the media player device may be implemented as an extended reality device configured to present, to the user, an extended reality world that includes various volumetric models generated based on volumetric 2D representations generated in the ways described herein. The providing of the 2D atlas image at operation 208 may be performed by way of a network transmission, a storage operation, or another suitable data communication as may serve a particular implementation.

Figure 3:
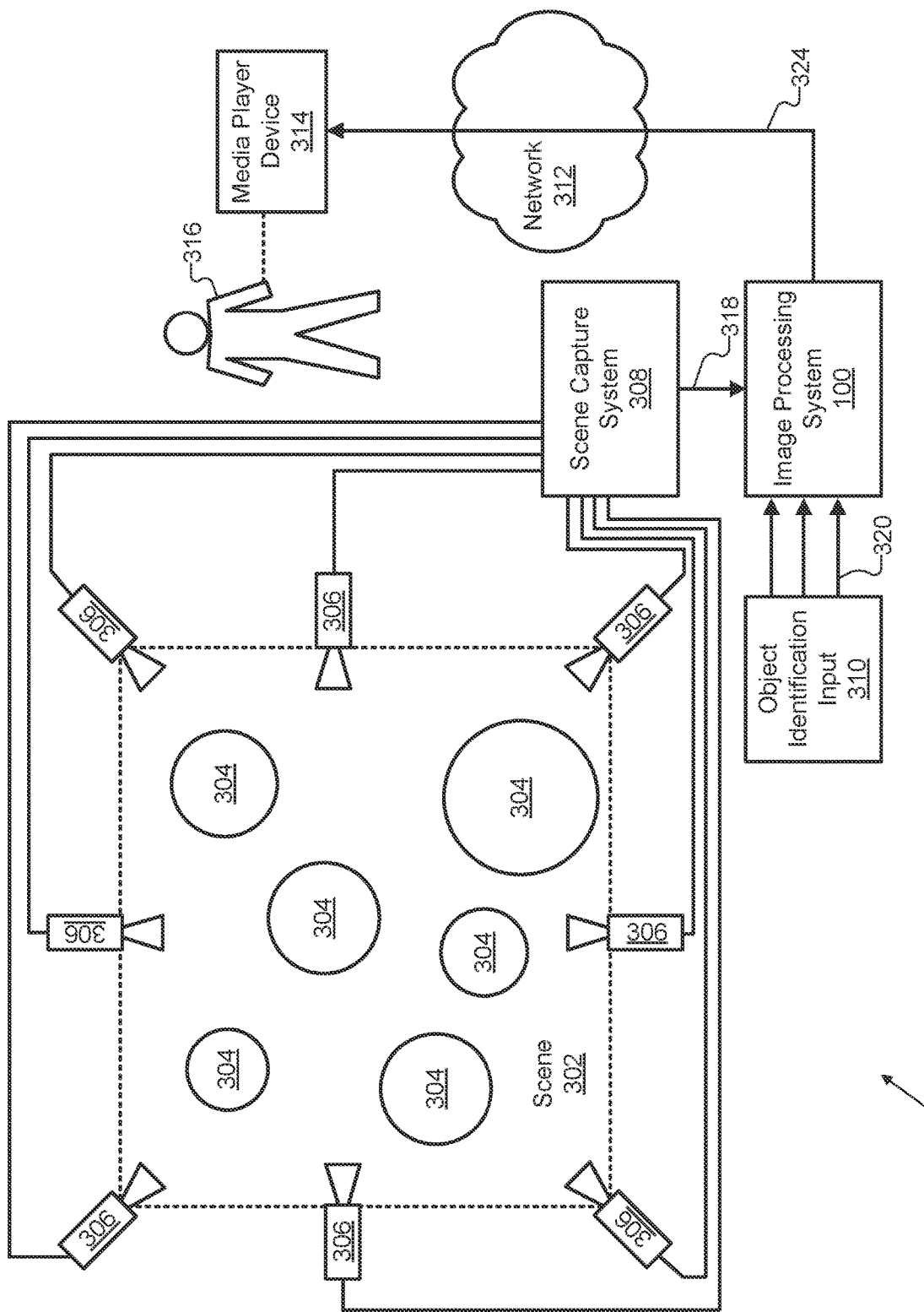
FIG. 3 shows an illustrative configuration within which the image processing system of FIG. 1 may operate to generate and provide a volumetric 2D representation of a 3D object according to embodiments described herein.

FIG. 3 shows an illustrative configuration 300 within which system 100 may operate to generate and provide one or more volumetric 2D representations of one or more 3D objects in accordance with principles described herein. As shown, configuration 300 may include a scene 302 within which a plurality of 3D objects 304 are present. Scene 302 and 3D objects 304 may be captured by a plurality of capture devices 306 that are disposed with respect to scene 302 so as to have different vantage points (e.g., different positions and orientations configured to allow the capture devices to capture the scene from different viewpoints and perspectives). A scene capture system 308 may process data captured by capture devices 306 and provide the data to system 100, which may use this data, as well as other suitable input data such as object identification input 310, to perform operations described herein and thereby provide, by way of a network 312, volumetric 2D representations of one or more of 3D objects 304 to a media player device 314 used by a user 316. System 100 and certain operations that it may be configured to perform have been described above. Each of the other components of configuration 300 shown in FIG. 3 will now be described in more detail as these components may relate to the operation of system 100.

Scene 302 is illustrated as a square-shaped scene outlined by a dotted line and including 3D objects 304 and capture devices 306. Scene 302 may be implemented as any type of real-world or virtual scene set indoors or outdoors and having any size or other characteristics as may serve a particular implementation. For instance, in one example, scene 302 may be a real-world studio setting where a single object is included within the scene for the purpose of generating and updating a volumetric model of the object. Conversely, in another example, scene 302 may be a relatively large real-world event venue such as a playing field where a sporting event is taking place or a stage where a concert or other such event is being performed. In these examples, a large number of 3D objects 304 (e.g., a large number of people and/or other suitable subjects) may be volumetrically modeled concurrently. In yet another example, scene 302 may be implemented by a virtual world (e.g., an imaginary world of a video game or virtual reality experience that is generated entirely using computer generated imagery, etc.) that is virtually captured and/or modeled in order to increase the efficiency of encoding, storing, distributing, and/or otherwise managing the scene.

Various 3D objects 304 are shown in the example of configuration 300 to be present within scene 302. While 3D objects 304 are illustrated in FIG. 3 as different sized circles, it will be understood that each 3D object 304 may represent any suitable type of real or virtual 3D object as may serve a particular implementation. For instance, different 3D objects 304 may be implemented as people (i.e., human body objects), animals, plants, vehicles, inanimate objects (e.g., props, furniture, etc.), and so forth may be present in a scene such as scene 302.

Configuration 300 shows that a set of capture devices 306 may be arranged around scene 302 at various positions and in various orientations so as to capture scene 302 from different vantage points. Capture devices 306 may capture various types of images from scene 302 so as to represent 3D objects 304 in different ways and from different perspectives. For example, capture devices 306 may capture both color data images and depth data images depicting 3D objects 304 from the different vantage points of capture devices 306.

As used herein, "color data images" may refer to images represented using "color data," which may broadly include any image data or video data, whether represented in color (e.g., Red-Green-Blue or "RGB") or grayscale, that represents how a subject (e.g., a 3D object 304 included within scene 302) may appear from a particular vantage point at a particular point in time or over a particular time period. Color data is not limited to any particular format, file type, frame rate, resolution, quality level, or other characteristic that may be associated with various definitions and/or standards defining image data and/or video data in the art. As such, color data images may be captured, formatted, transmitted, and represented in any suitable form. For example, color data images may be represented by digital data that is formatted according to a standard image format.

Similarly, as used herein, "depth data images" may refer to images represented using "depth data," which may include any data representative of positions, surface geometries, or other depth characteristics of 3D objects with respect to a 3D coordinate space. For example, depth data representative of a particular 3D object 304 may represent coordinates with respect to a coordinate system (e.g., a global coordinate system associated with scene 302) for different points on the surfaces of the object. As such, depth data images corresponding to color data images may depict, from the same or similar vantage points as the color data images, another view of the 3D objects 304. Specifically, rather than depicting the visible appearance of 3D objects 304 (i.e., rather than representing in color or grayscale how light interacts with the surfaces of 3D objects 304), depth data images may depict the depth (i.e., the distance or position) of points on the surfaces of 3D objects 304 with respect to the vantage point. As with color data images, depth data images may be captured, formatted, transmitted, and represented in any suitable form. For example, depth data images may be depicted using grayscale image data depicting, for each pixel in the image, how far away the point represented by that pixel is from the vantage point.

In order to capture color data images, capture devices 306 may include or be implemented by video cameras, still cameras, or other such color data image capture devices configured to generate 2D imagery depicting 3D objects 304

(and/or any other objects that may come to be present in scene 302) from the different positions and perspectives of capture devices 306. Additionally, capture devices 306 may further include or be implemented by depth capture devices (e.g., time of flight depth capture devices, stereoscopic depth capture devices, structured light depth capture devices, etc.) configured to scan 3D objects 304 within scene 302 to determine depth data representative of the surfaces of the objects in 3D space. In some examples, separate color data capture devices and depth data capture devices may implement capture devices 306 and may be placed in pairs at each of the positions around scene 302 shown in FIG. 3 so as to capture corresponding color and depth data images from each respective position. In other examples, each capture device 306 may be implemented as a combination color/depth capture device that integrates together both a color data capture device and a depth data capture device.

Scene capture system 308 may operate to control capture devices 306, process raw capture data provided by capture devices 306, and provide a scene representation 318 of scene 302 to system 100 that system 100 may use to generate volumetric 2D representations of 3D objects 304 in the ways described herein. In some examples, scene capture system 308 may direct operation of capture devices 306 in a manner that allows respective sets of images (e.g., color data images and/or depth data images) to be synchronously and continuously captured by capture devices 306 as 3D objects 304 change, move about scene 302, leave scene 302 or are joined by other 3D objects, and so forth. For example, scene capture system 308 may synchronize capture devices 306 to capture several frames (i.e., images) per second to continuously represent scene 302 over a period of time.

In some implementations, scene capture system 308 may direct the synchronous capture of scene 302, receive and manage raw image data captured by capture devices 306, and directly provide this image data to system 100 as scene representation 318. The data may be transmitted from capture devices 306 to scene capture system 308 and from scene capture system 308 to system 100 by way of any form of data communication including, for example, direct wired or wireless communication, network communication (e.g., using network 312 or another suitable network), and/or other communication involving any suitable communication technologies, devices, media, protocols, or the like as may serve a particular implementation.

In other implementations, scene capture system 308 may perform processing on the raw data so as to be able to provide scene representation 318 as a volumetric representation of the scene (e.g., a representation generated based on the raw image data captured by capture devices 306). For example, a volumetric model of scene 302 including a 3D mesh, textures configured to be mapped onto the mesh, and so forth, may be generated by scene capture system 308 and provided to system 100 to undergo more convenient and efficient data packaging (e.g., as a volumetric 2D representation) before being provided to media player device 314 by way of network 312. In certain examples, scene representation 318 may include individual volumetric models of each 3D object 304 that are generated by scene capture system 308 and provided to system 100 for conversion to the volumetric 2D representation that is to be transmitted to media player device 314. Additionally, as will be described in more detail below, scene capture system 308 may, in certain implementations, perform object segmentation or other such analysis to provide scene representation 318 as a pre-analyzed (e.g., pre-segmented) scene representation that image processing system 100 may receive and further process in the ways described herein.

Regardless of how the data of scene representation 318 is arranged, formatted, or implemented, scene representation 318 may represent scene 302 and the plurality of 3D objects 304 included therein. As such, system 100 may access scene representation 318 and identify within it a particular 3D object (e.g., one of 3D objects 304) that is of a recognized object type (e.g., a human body object type). As used herein, a 3D object of a "recognized object type" may refer to an object that is recognizable to system 100 (e.g., as opposed to an object that would be novel to, or unrecognized by, system 100) and for which additional data is available to system 100 (e.g., pose data representative of how the object is capable of being posed, etc.). Such 3D objects may include any suitable types of objects (e.g., human body objects, human face objects, pre-analyzed furniture objects or other inanimate objects, etc.) that system 100 may have special insight about (e.g., by being able to access data such as machine learning models that will be described in more detail below). As one example, based on a machine learning model accessible to system 100, system 100 may gain special insight into human body objects that allow system 100 to, for instance, identify a human body within an image, identify various components of the human body (e.g., body parts, etc.) regardless of the pose of the body in the image, make predictions about the pose of the body, assess confidence levels of pose estimations, and so forth. Accordingly, the identifying of each component of a 3D object may be performed by first identifying the 3D object as being of the recognized object type, then identifying the components based on insights that may be available for that recognized object type.

To illustrate, configuration 300 shows that, along with data of scene representation 318, additional object identification input 310 may be obtained by system 100 to facilitate the identifying of 3D objects and/or the identifying of specific components of recognized 3D objects. Object identification input 310 may be implemented by any data as may be provided to (or otherwise obtained by) system 100 to facilitate the recognition, segmentation, distinguishing, or other identification of 3D objects 304 (or components of 3D objects 304) as 3D objects 304 are represented in scene representation 318. As illustrated by several different arrows in FIG. 3, object identification input 310 may come in various forms and from various disparate sources.

As one example of object identification input, system 100 may obtain a machine learning model 320 associated with a particular object type. For example, machine learning model 320 may be obtained by system 100 to assist in successfully identifying or recognizing 3D objects 304 of that object type (e.g., a human body object type, etc.), or machine learning model 320 may be obtained in response to an identifying of a 3D object 304 as being of a particular recognized object type (e.g., the human body object type) such that machine learning model 320 is obtained (e.g., requested, received, etc.) because it is associated with the recognized object type.

As has been described above, system 100 may identify one or more different components of 3D objects 304 that are included in scene representation 318. For example, for a 3D object 304 implemented as a human body object, system 100 may identify the head, torso, arms, and legs (as well as other distinguishable components or subcomponents of the human body object as may serve a particular implementation) based on scene representation 318. In some examples, this identification may be performed as part of a segmentation of the 3D object into its known constituent components. For instance, for each pixel, voxel, triangle, or other unit of scene representation 318 that corresponds to a particular 3D model 304, system 100 may label (or otherwise assign or designate) that unit as being associated with a particular component known to be included in the object type (e.g., with a head, torso, left arm, right arm, etc., in the case of a human body object type).

Segmentation or other types of component identification or distinguishing may be performed in any suitable way and by any suitable system. For instance, in certain examples as mentioned above, scene capture system 308 may perform segmentation of objects in scene representation 318 and provide scene representation 318 with data representative of a segmentation of one or more of the objects in the scene as they have already been segmented. In other examples, image processing system 100 may perform the segmentation based on a non-segmented (or not fully segmented) scene representation 318 that is received from scene capture system 308. For instance, to facilitate segmentation or other suitable component identification or distinguishing of one component from other components, machine learning model 320 may be employed to provide system 100 with unique insights into how the components typically interact with one another for different known poses of the recognized object type. For example, system 100 may identify one component of a particular 3D object 304 based on machine learning model 320, which, as mentioned above, may be obtained in response to the identifying of 3D object 304 as being of the recognized object type (e.g., a human body object type).

Machine learning model 320 may be provided by a machine learning system (not explicitly shown in configuration 300) that may perform machine learning processing based on a set of training images and training or ground truth input associated with each training image. For example, machine learning model 320 may be generated and maintained (e.g., updated, corrected, enhanced, and/or otherwise managed) in a manner that provides system 100 with specific information (e.g., special insight) regarding a recognized object type such as a human body object or other object that has been modeled with machine learning techniques. In this way, system 100 may successfully and efficiently perform object segmentation and/or other component registration or recognition operations, as well as other operations involving pose estimations of the object, feature identification from frame to frame, and so forth.

In certain examples, system 100 may identify features of a recognized object without relying on a machine leaning model such as machine learning model 320. For example, other types of object identification input 310 could include explicit bone transformation data such that recognized objects could be tracked and successfully segmented without reliance on a machine learning model. When available, however, a robust machine learning model such as machine learning model 320 may serve as a data filter or screen to help ensure that segmentation, pose estimation, and other such operations are performed accurately and effectively.

A machine learning system may generate and manage machine learning model 320 based on training images and other input data (e.g., training/ground truth input data) that may involve human input such as from expert annotators or other sources (e.g., crowdsourcing, etc.). For example, the machine learning system may incorporate one or more machine learning networks configured to perform various types of machine learning tasks. One example of a machine learning network incorporated into the machine learning system may be a semantic segmentation network configured to semantically segment different components of an object such as different body parts (e.g., right hand, left hand, head, torso, etc.) for a human body object. Another machine learning network incorporated into a machine learning system may be a joint detection network configured to identify various joints of an object regardless of how the object is posed (since certain types of objects such as human body objects may be posed in a large number of different ways).

The training of a machine learning model such as machine learning model 320 to enable efficient and effective object segmentation and/or other component identification and labeling may involve a combination of human input (e.g., by expert annotators, by open source contributors, etc.) and automation processes to make efficient use of the human contributors' time and ability in the creation of ground truth interpretations. Specifically, rather than relying on a training expert to locate each and every joint or segmentation line for each and every training image, the machine learning system may use machine learning model 320 (even as the machine learning model is being generated and improved) to locate joints and segments for each training image. An annotation tool (e.g., a computer interface configured to facilitate the training process) that presents these estimations to a human expert may be employed to make it easy for the expert to either approve the estimations (if the expert determines that the system has estimated correctly and accurately), or to correct the estimations (if the expert determines that the system has erred). In this way, one or more human experts may team with the machine learning system in the machine learning training process to efficiently manage machine learning model 320. In some examples, machine learning training processes may also use previously trained datasets or non-expert human trainers (e.g., crowd-sourced human resources) or other training techniques as may serve a particular implementation.

Based on the segmentation of various components of each 3D object 304, system 100 may generate respective sets of 2D images depicting each component from respective vantage points tailored to the individual components in the ways that have been described. As one example, a left hand component of a particular human body object 304 represented in scene representation 318 will be considered. System 100 may identify the left hand within scene representation 318 based on machine learning model 320 (e.g., a machine learning model corresponding to human body objects in this example) and/or based on additional object identification input 310 as may serve a particular implementation. Based on this identification of the left hand, a number of vantage points tailored to the hand (e.g., six vantage points associated with sides of a virtual bounding box that tightly encloses the hand in one example) may be identified, and a respective 2D image depicting the hand from each of these vantage points may be generated and included in the set of 2D images. System 100 may then incorporate some or all of this set of 2D images, as well as one or more other sets of 2D images that correspond to other components of the 3D object (e.g., other body parts besides the left hand) or to other 3D objects 304 (e.g., other people and/or objects at scene 302), within a 2D atlas image 324 that is associated with the 3D object 304. For example, 2D atlas image 324 may implement a volumetric 2D representation of the 3D object 304 or may be included as part of such a volumetric 2D representation (e.g., along with other 2D atlas images associated with other components and not explicitly shown in FIG. 3).

Various advantages may result from representing the 3D object and components thereof (e.g., including the left hand component of the example above) in a 2D atlas image that incorporates various 2D color and depth data images (e.g., such as 2D atlas image 324). For example, one advantage is that a wide array of effective and well established tools and protocols have already been developed to analyze, encode, compress, package, transmit, store, and widely distribute (e.g., multicast, broadcast, etc.) 2D images such as 2D still images and 2D video content. While most of these established tools and protocols would not be readily deployable for conventional 3D representations of volumetric objects or scenes (e.g., representations that describe triangles of a mesh, textures to be mapped onto the triangles, etc.), any or all of these tools and protocols may be readily leveraged for a volumetric 2D representation of the 3D object (e.g., such as may be implemented by 2D atlas image 324). Accordingly, as shown, 2D atlas image 324 may be provided by system 100 to media player device 314 by way of network 312.

Network 312 may include any network elements and/or characteristics as may serve a particular implementation. For example, network 312 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 312 may include elements of various interconnected networks that are outside of any provider network and outside the control of any provider of such a provider network. Elements of the Internet, a wide area network, a content delivery network, and/or any other suitable network or networks are examples of other elements that may be included within network 312. Any of these provider or non-provider networks or network elements may provide data delivery between system 100 and media player device 314.

As has been described, system 100 may provide a 2D atlas image such as 2D atlas image 324 to any type of rendering device that is configured to render (e.g., based on the 2D atlas image) a volumetric representation of the 3D object associated with the 2D atlas image. As shown in configuration 300, one example of such a rendering device may be media player device 314, which may be used by user 316 and configured to present the volumetric representation of the 3D object 304 to user 316. Other examples of rendering devices (not explicitly shown in FIG. 3) may include other systems or devices on the server side of network 312 with system 100 that are configured to assist with content generation in various ways.

Media player device 314 may be implemented as any type of computing device used by user 316 to render and experience volumetric representations (e.g., volumetric models, etc.) of 3D objects 304 of scene 302. For example, if a volumetric representation of a 3D object 304 is to be presented as part of an extended reality experience (e.g., a virtual reality experience, an augmented reality experience, etc.) in which user 316 is engaged, media player device 314 may be implemented as an extended reality device (e.g., a head-mounted device) configured to render and present the extended reality experience. In the same or other examples, media player device 314 may be implemented as a general-purpose computing device (e.g., a mobile device such as a smartphone or tablet device, a personal computing device such as a laptop computer, etc.). Such a device may present an extended reality experience to user 316 that features volumetric representations of 3D objects 304 included in scene 302. In other examples, such media player devices 314 may present volumetric or other representations in other suitable types of applications such as communications applications (e.g., a 3D video phone), engineering applications (e.g., a 3D computer-aided design application), or any other type of application that makes use of 2D or 3D object models.

Various elements of configuration 300 have been described in relation to FIG. 3 to provide a relatively broad, high-level illustration of how an image processing system such as system 100 may generate volumetric 2D representations of 3D objects in accordance with a method such as method 200. FIGS. 4A-8 will now be described to further illustrate certain aspects of such systems and methods and to provide more specific examples of the elements of configuration 300. These examples and aspects will be understood to be offered as illustrative examples only, and will not be understood to limit the scope of how systems and methods for generating volumetric 2D representations of 3D objects may be implemented in other examples.

Figure 4B:
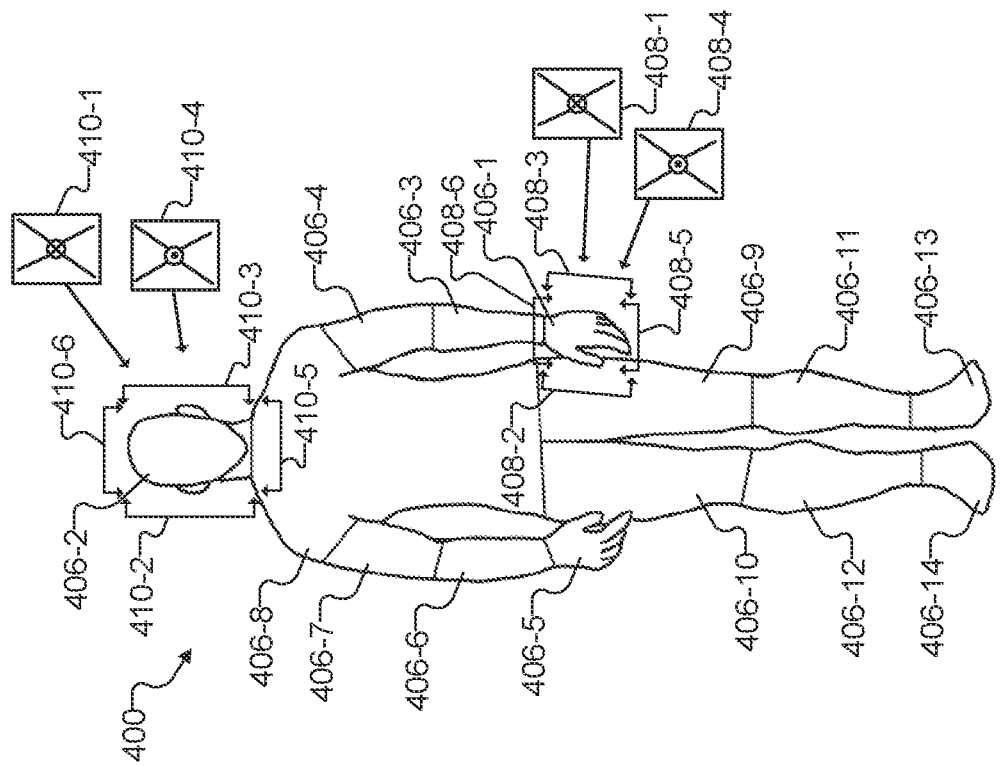
FIG. 4B shows an illustrative segmentation of the 3D object of FIG. 4A and illustrative sets of vantage points tailored to certain of the components of the 3D object according to embodiments described herein.
Figure 4A:
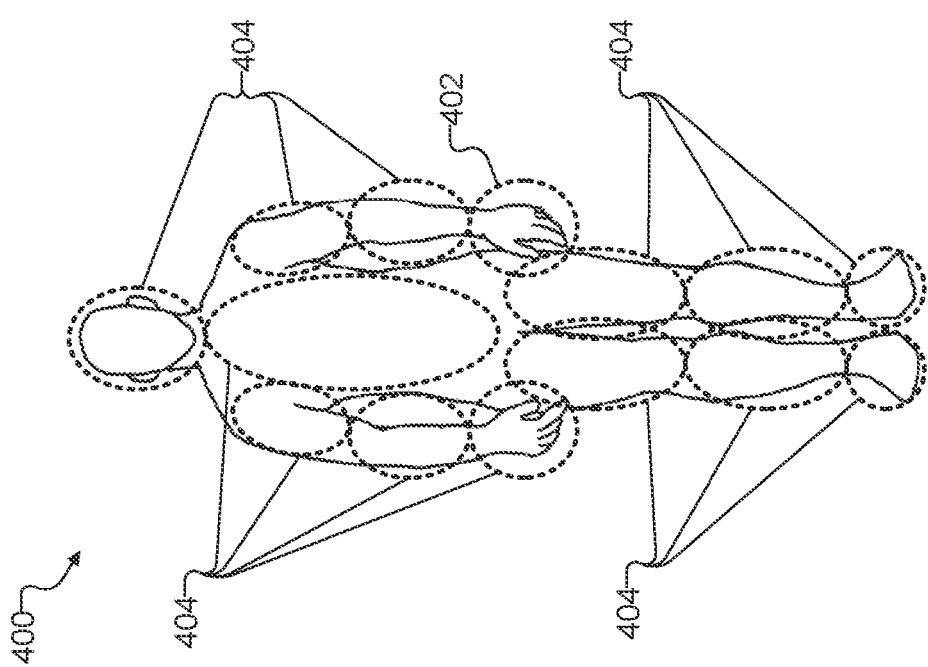
FIG. 4A shows an illustrative 3D object of a recognized object type that includes a plurality of distinguishable components according to embodiments described herein.

FIG. 4A shows an illustrative 3D object 400 of a recognized object type that includes a plurality of distinguishable components. Specifically, 3D object 400 is shown to be of a human body object type for which may be available a machine learning model or other data that gives insight about the object type to system 100. Because 3D object 400 is implemented as a human body object, 3D object 400 will also be referred to herein as "human body object 400" or simply "body 400." 3D object 400 may represent an illustrative implementation of any of 3D objects 304 of scene 302 described above or may represent another 3D object associated with a real-world or virtual scene other than scene 302.

As shown, a first component 402 of human body object 400 may be identified by system 100 as being distinguishable from a plurality of other components 404 of the object. For purposes of illustration in this figure and other figures described below, component 402 happens to be a left hand of human body object 400, and, as such, component 402 will also be referred to herein as "hand component 402" or simply "hand 402." Other components (e.g., body parts) of body 400 may similarly be referred to as "components 404" or using a name of the specific body part (e.g., a head 404, a torso 404, an upper arm 404, etc.).

As described above, system 100 may identify various components 402 and/or 404 of a 3D object such as human body object 400 using a representation of the object (e.g., included within scene representation 318) and, in some examples, additional object identification input such as a machine learning model (e.g., machine learning model 320) or other object identification input 310 described herein. One way that such identification may be performed is by segmenting body 400 and labeling each component 402 and 404 based on a machine learning model of the human body. For example, each pixel, voxel, triangle, or other unit corresponding to component 402 in a scene representation may be labeled (e.g., designated, assigned, consistently represented, etc.) as being part of hand 402, while other units corresponding to other components 404 may be labeled as being part of other respective components 404 such as a lower left arm, an upper left arm, a head, a left foot, or the like. Dotted circles associated with hand 402 and various other illustrative components 404 show regions of body 400 that may be labeled as different components, but it will be understood that a particular segmentation of body 400 may result in more, fewer, or different components than are illustrated in FIG. 4A.

FIG. 4B shows a particular illustrative segmentation of human body object 400 that corresponds to the components 402 and 404 illustrated in FIG. 4A. As shown in FIG. 4B, lines have been drawn on body 400 so as to segment body 400 into segments 406 that approximately align with the different components 404 described and illustrated above in relation to FIG. 4A. Specifically, a segment 406-1 corresponds to left hand component 402, a segment 406-2 corresponds to head component 404, a segment 406-3 corresponds to lower left arm component 404, a segment 406-4 corresponds to upper left arm component 404, a segment 406-5 corresponds to right hand component 404, a segment 406-6 corresponds to lower right arm component 404, a segment 406-7 corresponds to upper right arm component 404, a segment 406-8 corresponds to torso component 404, a segment 406-9 corresponds to upper left leg component 404, a segment 406-10 corresponds to upper right leg component 404, a segment 406-11 corresponds to lower left leg component 404, a segment 406-12 corresponds to lower right leg component 404, a segment 406-13 corresponds to left foot component 404, and a segment 406-14 corresponds to right foot component 404.

Also shown in FIG. 4B is an illustrative set of vantage points 408 tailored to hand component 402 (i.e., vantage points 408-1 through 408-6) and an illustrative set of vantage points 410 tailored to head component 404 (i.e., vantage points 410-1 through 410-6). While hand 402 and head 404 are the only components of human body object 400 for which illustrative vantage points are explicitly depicted in FIG. 4B, it will be understood that similar sets of vantage points may be designated for each respective component 404 of body 400 (e.g., based on the respective segments 406 of these components 404 that have been identified as a result of the segmentation). In some examples, each of these sets of vantage points may similarly include six vantage points such as shown in the examples of the sets of vantage points 408 and 410. In other examples, some or all of these sets of vantage points may include different numbers of vantage points as may serve a particular implementation.

Referring to the set of vantage points 408 tailored to hand 402, six different vantage points 408 are shown to be associated with each of various sides of hand 402. For example, if a virtual 3D bounding box (e.g., a rectangular prism configured to fit hand 402) is configured to encapsulate hand 402, each of the six vantage points 408 may be associated with one face of the 3D bounding box. In order to illustrate vantage points that, respectively, point into and out of the page, vantage points 408-1 and 408-4 employ special symbols drawn to the side of hand 402 for clarity of illustration. Specifically, vantage point 408-1 uses a symbol with a circled 'x' to represent a vantage point that is in front of hand 402 and pointing inward toward hand 402, while vantage point 408-4 uses a symbol with a circled dot to represent a vantage point that is behind hand 402 and pointing outward toward hand 402. Additionally, as shown, other vantage points 408 in the set include: a vantage point 408-2 that represents hand 402 from the thumb side of the hand, a vantage point 408-3 that represents hand 402 from the pinkie side of the hand, a vantage point 408-2 that represents hand 402 from beneath hand 402 (i.e., pointing upward from the tips of the fingers), and a vantage point 408-6 that represents hand 402 from above hand 402 (i.e., from inside the wrist where hand 402 connects to lower arm 404).

The set of vantage points 408 may each be any type of vantage point as may serve a particular implementation. For instance, in certain examples, the vantage points 408 may be orthographic vantage points that allow for a set of 2D images depicting hand 402 to be generated in a manner that orthographically depicts hand 402. In orthographic depictions of an object, rays of light emanate in parallel from a plane, rather than radiating outward from a single point of origin (as is the case for perspective depictions of an object). For this reason, each vantage point 308 is shown to be a line segment having arrows at the ends pointing in parallel in a particular direction (i.e. toward hand 402) or as a planar area (e.g., a rectangle) with a symbol representing an arrow pointing into the page (the circled 'x') or out of the page (the circled dot). In other implementations, vantage points such as vantage points 408 may be perspective vantage points that would allow for a set of 2D images depicting a 3D object to be generated that depict the 3D object from the perspective of a particular point in space.

To illustrate another example of how vantage points may be tailored to a 3D object, the set of vantage points 410 tailored to head component 404 is shown to include: a vantage point 410-1 that allows for an orthographic depiction of head 404 to be represented from straight on (i.e., in front of the person), a vantage point 410-2 that allows for an orthographic depiction of head 404 to be represented from the person's right, a vantage point 410-3 that allows for an orthographic depiction of head 404 to be represented from the person's left, a vantage point 410-4 that allows for an orthographic depiction of head 404 to be represented from behind the person, a vantage point 410-5 that allows for an orthographic depiction of head 404 to be represented from below the person (e.g., from beneath the chin and inside the neck or chest), and a vantage point 410-6 that allows for an orthographic depiction of head 404 to be represented from above the head. While not explicitly illustrated in FIG. 4B, it will be understood that each segment 406 may similarly be associated with a respective set of vantage points that correspond to each segment 406 in a similar way as vantage points 408 correspond to segment 406-1 and vantage points 410 correspond to segment 406-2.

While vantage points 408 and 410 have been described as being aligned with the plane of the page on which FIG. 4B is drawn (e.g., referring to left, right, up, down, into, and out of the page), it will be understood that this alignment is used as a matter of convenience of description and illustration and is not necessary. Indeed, each vantage point in a set of vantage points tailored to a particular component of a 3D object may be oriented in any suitable direction with respect to the component. In certain examples, vantage points may be dynamic vantage points that change to continuously track the component even as the component moves and changes in time.

Figure 5:
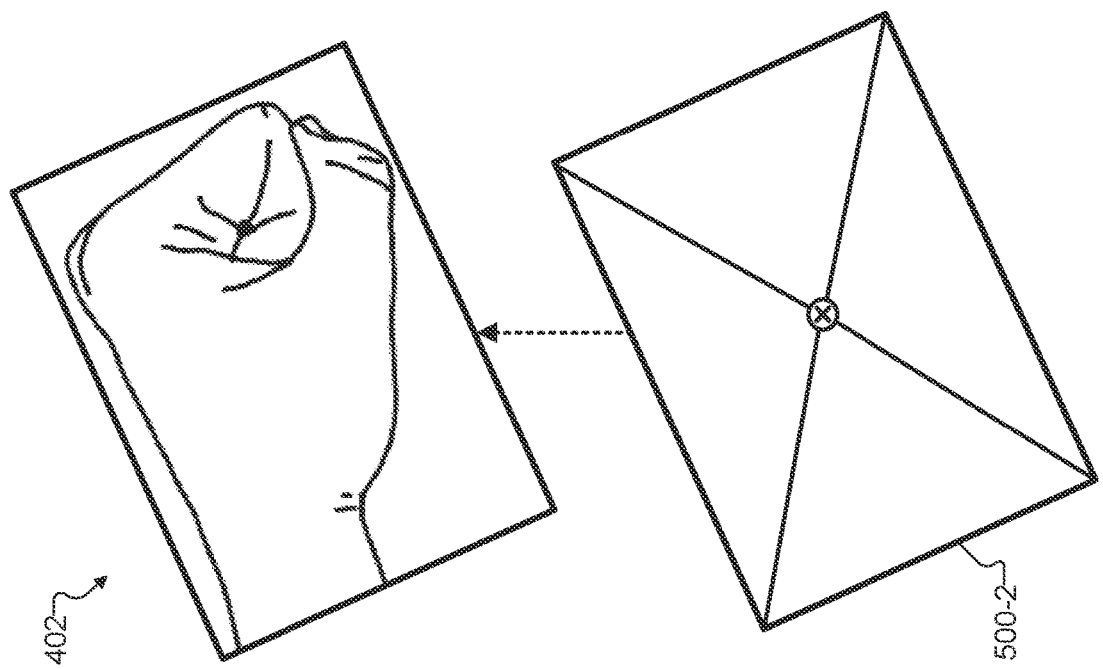
FIG. 5 shows an illustrative dynamic vantage point that is dynamically tailored to a component of a 3D object with respect to one or more illustrative attributes of the component according to embodiments described herein.
Figure 5:
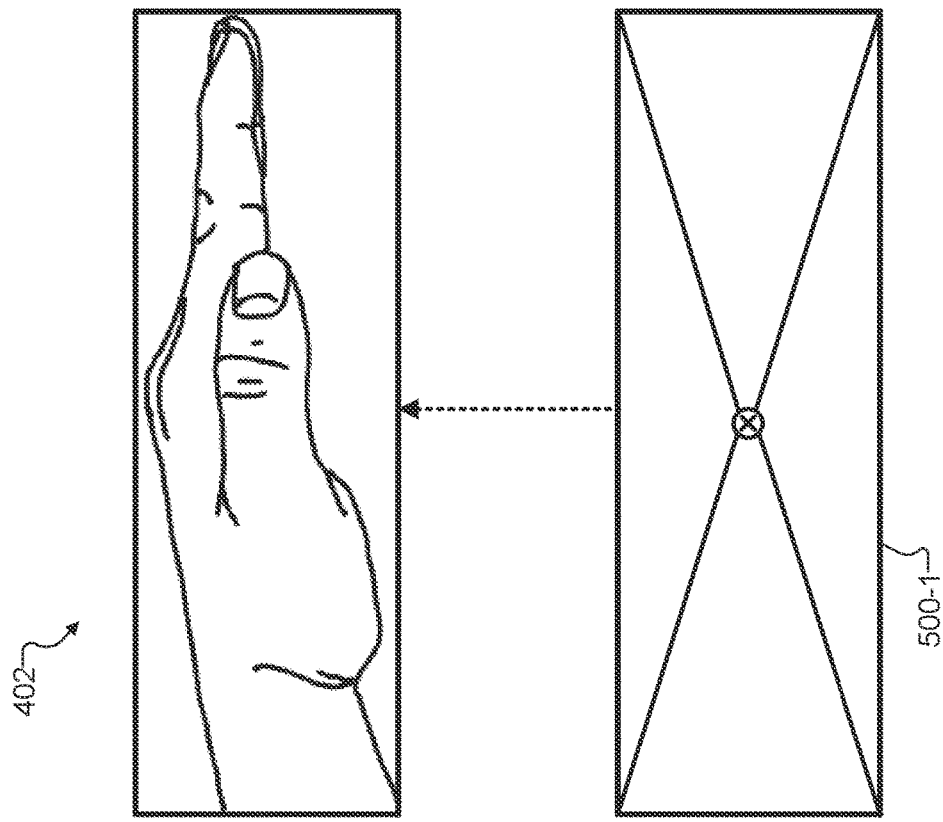

To illustrate, FIG. 5 shows an illustrative dynamic vantage point 500 that is tailored to hand component 402 of human body object 400 as the hand changes with respect to one or more illustrative attributes. Specifically, as shown, dynamic vantage point 500 is illustrated at two moments in time by a vantage point 500-1 (corresponding to a first moment in time when hand 402 is open flat) and a vantage point 500-2 (corresponding to a second moment in time when hand 402 is clenched into a fist). At both moments in time, dynamic vantage point 500 is shown to depict hand 402 from the same side of the hand (i.e., the thumb side, rather than the pinkie side), analogous to vantage point 408-2 described above. However, as hand 402 changes its size, shape, position, orientation, and so forth (e.g., as it moves and clenches into the fist, etc.), dynamic vantage point 500 is shown to adjust its size, shape (e.g., aspect ratio), position, and orientation (e.g., rotation) accordingly.

A dynamic vantage point such as vantage point 500 may be configured to be tailored to a component with respect to one or more of a size attribute (e.g., the overall size of hand 402 as viewed from a particular viewpoint), an aspect ratio attribute (e.g., the width to length relationship of hand 402 as viewed from the particular viewpoint), a position attribute (e.g., the spatial location of hand 402 with respect to object 400 and/or a scene within which object 400 is located), an orientation attribute (e.g., the manner in which hand 402 is rotated or otherwise posed or oriented with respect to object 400 and/or the scene), and/or any other suitable attributes. For example, as shown at the first moment in time, vantage point 500-1 is shown to be relatively long and narrow to match the orientation of hand 402 at that moment in time. Then, by the second moment in time, it is shown that system 100 may tailor vantage point 500-2 to hand 402 based on a real-time state of hand 402. Specifically, as shown at the second moment in time, vantage point 500-2 has a shorter and wider aspect ratio that better contains the first shape of the hand, vantage point 500-2 has rotated to better match the orientation of hand 402, and so forth. In these types of ways, system 100 may tailor a set of vantage points, based on a real-time state of a component prior to the generating of a set of 2D images associated with the vantage points, to the component with respect to the size attribute, the aspect ratio attribute, the position attribute, the orientation attribute, and/or any other attributes of the component as may serve a particular implementation.

As illustrated by dynamic changes to dynamic vantage point 500 as attributes of hand 402 change and evolve (e.g., as the hand moves in space, clenches into a fist, rotates, etc.), a virtual 3D bounding box that fits relatively tightly around a 3D object may be used to determine an efficient vantage point. For example, for the particular vantage point on the thumb-side of hand 402, a bounding box is shown to closely fit the hand both when the hand is laid flat and when it is clenched into the fist. A bounding box volume may be generated around a particular component such as hand 402 by traversing each vertex and determining a minimum and a maximum (with respect to a particular coordinate space) that encapsulates all of the units (e.g., triangles) that are labeled as corresponding to the particular component. In this way, the bounding box may be made to fit closely with the object regardless of how the object may move and change. All of these modifications to the bounding box and corresponding vantage points may be performed in real time as 3D objects move and change such that dynamic vantage points continuously provide an efficient view of just the relevant portions of the assigned 3D object and do not redundantly illustrate other components or objects that are accounted for by other vantage points.

Figure 6:
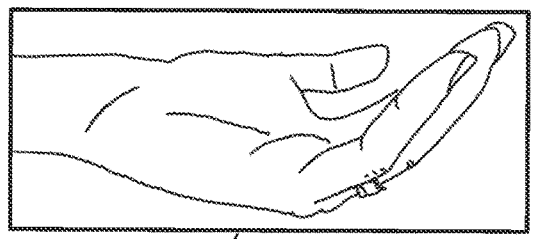
FIG. 6 shows an illustrative set of 2D images depicting a component of a 3D object from a set of vantage points tailored to the component according to embodiments described herein.
Figure 6:
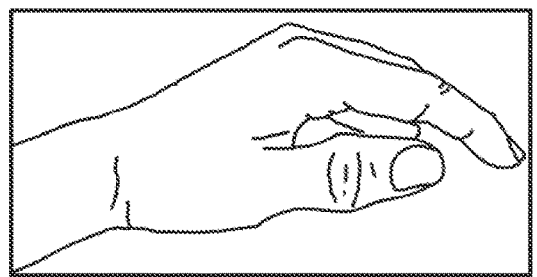
Figure 6:
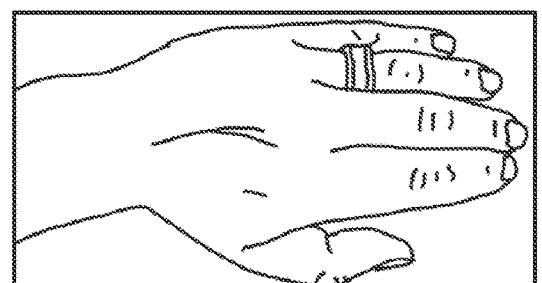
Figure 6:
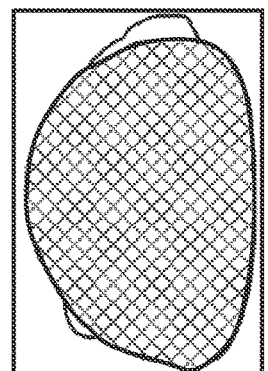
Figure 6:
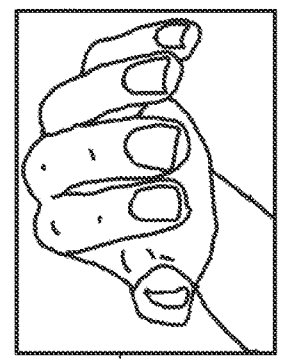
Figure 6:
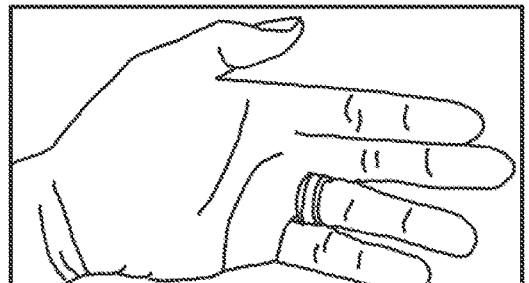

FIG. 6 shows an illustrative set of 2D images 600 (e.g., 2D images 600-1 through 600-6) depicting hand component 402 of 3D object 400 from the set of vantage points 408 (e.g., vantage points 408-1 through 408-6, respectively) tailored to hand component 402. More specifically, as shown, 2D image 600-1 shows the back side of hand 402 (from vantage point 408-1), 2D image 600-2 shows the thumb side of hand 402 (from vantage point 408-2), 2D image 600-3 shows the pinkie side of hand 402 (from vantage point 408-3), 2D image 600-4 shows the palm side of hand 402 (from vantage point 408-4), 2D image 600-5 shows the fingertip side of hand 402 (from vantage point 408-5), and 2D image 600-6 shows the wrist side of hand 402 (from vantage point 408-6).

The set of 2D images 600 is shown in FIG. 6 to include six 2D images associated with the six vantage points 408 of the set of vantage points 408 corresponding to hand 402. However, it will be understood that the set of 2D images 600 may include more or fewer 2D images in certain examples than are shown in FIG. 6. For example, the 2D images 600 shown in FIG. 6 may represent color data images from each of vantage points 408 that are included in the set, and, though not explicitly shown in FIG. 6, it may be understood that six depth data images from the same six vantage points 408 may be further included in the set in certain implementations. As such, the set of 2D images 600 may thus include both 1) color data images depicting hand component 402 from each of the vantage points of the set of vantage points 408, and 2) depth data images depicting hand component 402 from each of the vantage points of the set of vantage points 408. In this example in which six vantage points 408 are included in the set, a total of twelve 2D images may therefore be generated for the set of 2D images 600 tailored to hand component 402. As mentioned above, the total number of 2D images in the set may be different for 3D objects that employ more or fewer vantage points than the six used in this example, or for implementations that employ more or fewer types of image data than the two data types (i.e., color data and depth data) of this example.

Additionally, the number of 2D images in the set of 2D images 600 may be changed based on a determination by system 100 that certain 2D images would not substantively contribute any useful information to the construction of a volumetric representation, and that these 2D images may consequently be excluded (e.g., dropped, filtered, etc.) to increase efficiency of the overall volumetric 2D representation. More particularly, system 100 may identify one or more deficient 2D images 600 from among the set of 2D images 600, and the one or more deficient 2D images may be excluded from the one or more 2D images 600 of the set of 2D images 600 that are ultimately incorporated within a 2D atlas image.

As one specific example, FIG. 6 shows that 2D images 600-1 through 600-5 each provide different and useful perspectives of hand 402 such that a good volumetric representation of hand 402 could be generated based on the information included in these five images (or ten images if it is assumed that each of 2D images 600 is also associated with a corresponding depth data image that is not explicitly shown in FIG. 6). However, as is further shown in FIG. 6, 2D image 600-6 provides a perspective of hand 402 that, while different from the others, is not particularly useful. Vantage point 408-6 of 2D image 600-6 is an orthographic vantage point that is largely located within the wrist of the human body object, such that most of 2D image 600-6 comprises a shaded area for which system 100 has no image data (e.g., because it is internal to the hand/wrist portion of body 400, where no actual capture devices are able to capture data). Accordingly, system 100 may determine that 2D image 600-6 (as well as a corresponding depth data image from vantage point 408-6, not explicitly shown in FIG. 6) are not particularly useful for representing hand 402, and may therefore identify 2D image 600-6 (as well as the depth data image) as a deficient 2D image that is to be excluded from the 2D atlas image that will be provided to the volumetric rendering device (as will be described in more detail below).

Figure 7:
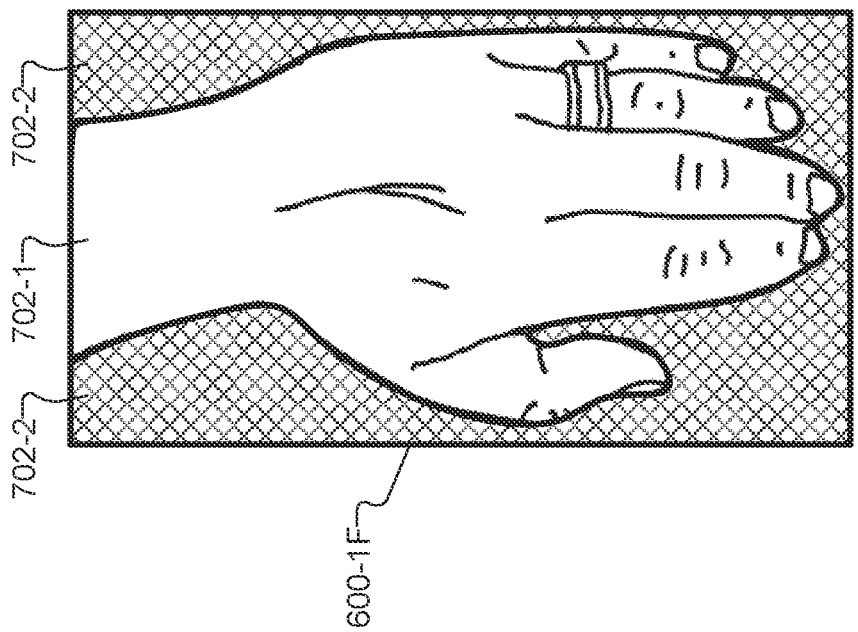
FIG. 7 shows an illustrative filtering out of content from a 2D image according to embodiments described herein.
Figure 7:
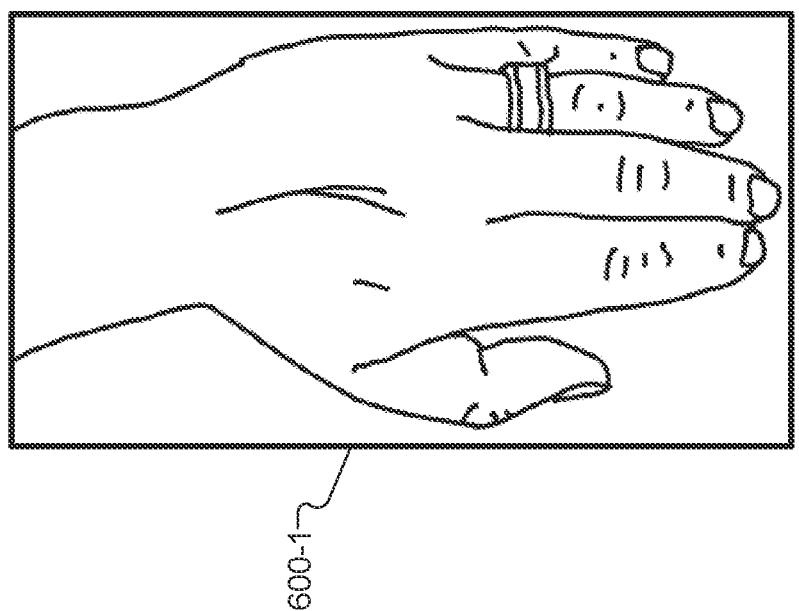

FIG. 7 illustrates an additional way (along with excluding deficient 2D images such as 2D image 600-6) that system 100 may increase the effectiveness and/or efficiency of a volumetric 2D representation. Specifically, FIG. 7 shows an illustrative filtering out of content from a 2D image such as 2D image 600-1. After an object segmentation or other object identification process has been performed with respect to a 3D object such as body 400, components of the 3D object such as hand component 402 may be properly labeled or designated such that system 100 may be able to readily track which pixels of a 2D image are associated with the component and which pixels are not. Accordingly, the generating of 2D images 600 may include filtering out (e.g., based on the segmentation, labeling, and/or other identifying of the relevant component) content other than the relevant component from each of the 2D images 600 of the set. For example, as shown in FIG. 7 for 2D image 600-1 (shown in its original form on the left and in a filtered form on the right), content 702-1 that has been identified as being representative of hand component 402 may be kept while content 702-2 that does not represent hand component 402 may be filtered out. This is illustrated by the shaded area in the filtered version of 2D image 600-1, labeled as 2D image 600-1F ('F' for "Filtered").

By filtering out content 702-2, various efficiencies and other benefits may be provided. For example, 2D image 600-1F may be packed more tightly with other non-rectangular 2D images incorporated within a 2D atlas image since the filtered out portions of the 2D image are designated as not including important information and can therefore be covered up by other 2D images as the 2D atlas image is constructed. As another example, even if filtered-out content 702-2 is not covered up in the 2D atlas image by more useful information, filtered-out content 702-2 may be highly compressible or otherwise efficient to store, transmit, and process as compared to content that would otherwise surround content 702-1.

Yet another advantage of differentiating content 702-1 representative of the relevant component (e.g., hand 402 in this example) and filtered-out content 702-2 relates to depth data images in particular. Specifically, by filtering out content 702-2, a depth resolution may be remapped to represent only the maximum and minimum depth values that are actually associated with the relevant component and not with other components or objects in the background (that may have very different depths in certain examples). Accordingly, even with a relatively small depth resolution of just a few bits, a meaningful depth representation of the relevant component may be represented in a filtered 2D depth data image such as 2D image 600-1F.

Figure 8:
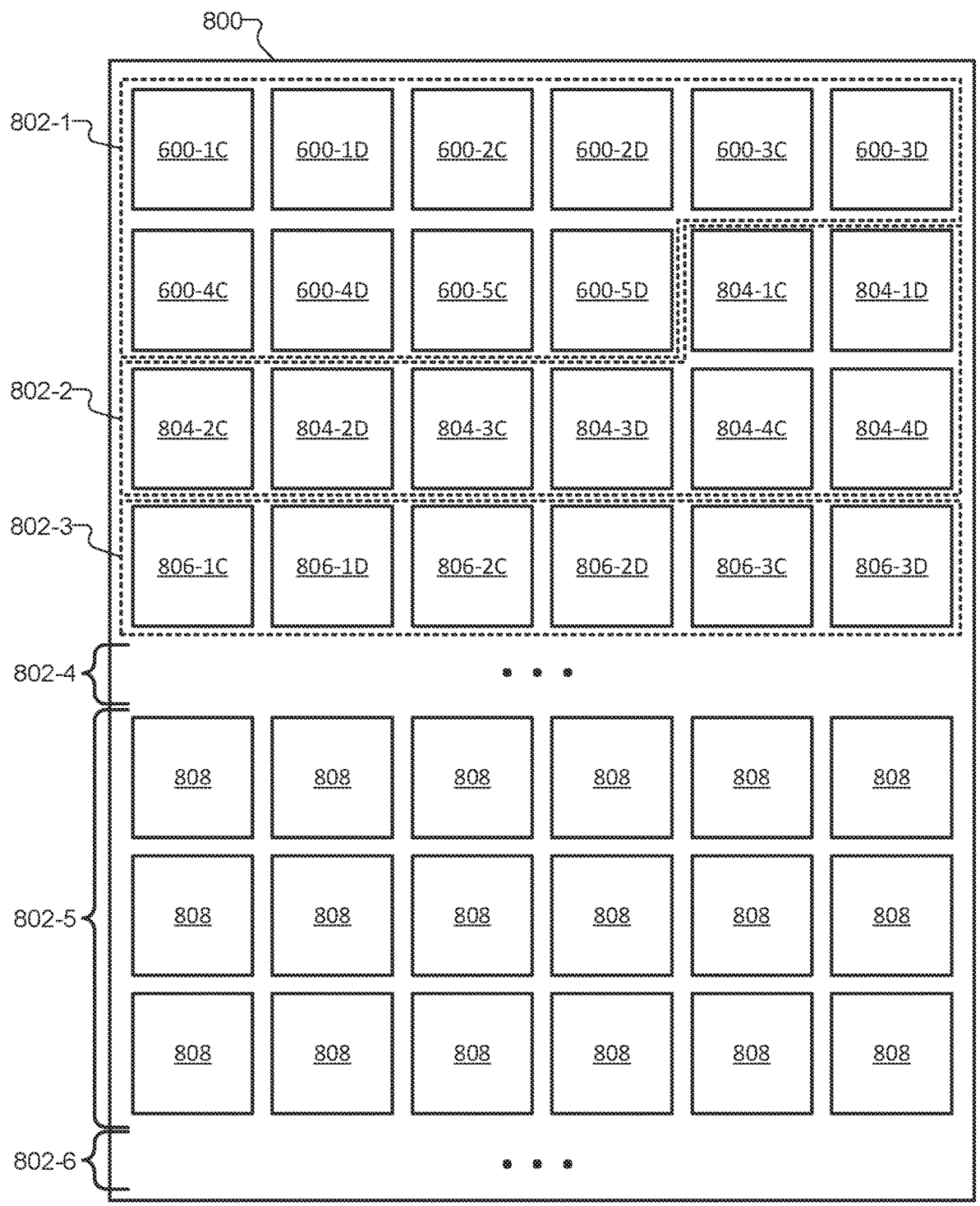
FIG. 8 shows an illustrative 2D atlas image implementing or included within a volumetric 2D representation of one or more 3D objects according to embodiments described herein.

FIG. 8 shows an illustrative 2D atlas image 800 implementing or included within a volumetric 2D representation of one or more 3D objects such as 3D object 400 and/or other 3D objects 304. While FIG. 8 shows a single frame of 2D atlas image 800, it will be understood that 2D atlas image 800 may be included within a frame sequence that includes many frames that each incorporate the same 2D images shown FIG. 8. Additionally, as will be described in more detail below, it will be understood that 2D atlas images may incorporate more or fewer 2D images representative of more or fewer 3D objects and/or components thereof than are illustrated in FIG. 8 as being included within 2D atlas image 800.

Small squares labeled with different reference numbers are used in FIG. 8 to represent various 2D images incorporated within (e.g., packed onto, combined together to form, etc.) 2D atlas image 800. As shown, various groups 802 (e.g., groups 802-1 through 802-6) of these 2D images may all be incorporated together onto a single 2D atlas image. For example, a first group 802-1 is shown to include 2D images 600 described above as being tailored to hand component 402 of human body object 400. Specifically, group 802-1 (i.e., the group including all the 2D images 600 encircled by a dotted line labeled 802-1) includes both color data images (labeled with a 'C' and including 2D images 600-1C, 600-2C, 600-3C, 600-4C, and 600-5C) and depth data images (labeled with a 'D' and including 2D images 600-1D, 600-2D, 600-3D, 600-4D, and 600-5D) that, as illustrated above in relation to FIG. 6, depict hand component 402 from various different vantage points 408 that are dynamically tailored to the hand component. As shown, 2D images 600-6 (e.g., what would have been 2D images 600-6C and 600-6D) are excluded from (i.e., not incorporated within) 2D atlas image 800 for the reasons described above. By excluding these deficient 2D images, FIG. 8 shows that there is more room for other 2D images associated with other components and/or other 3D objects.

Incorporated within 2D atlas image 800 together with the 2D images of group 802-1, a group 802-2 of 2D images 804 (e.g., color data images 804-1C through 804-4C and depth data images 804-1D through 804-4D) and a group 802-3 of 2D images 806 (e.g., color data images 806-1C through 806-3C and depth data images 806-1D through 806-3D) are also shown in FIG. 8. The 2D images included in these groups 802 will be understood to be tailored to other components 404 of body 400. For instance, 2D images 804 of group 802-2 may be tailored to the lower left arm component 404 that connects to hand 402 (which may include 2D images from only four vantage points due to vantage points cutting through the top and bottom of the forearm yielding deficient 2D images), while 2D images 806 of group 802-3 may be tailored to another component 404 such as the torso (which may include three non-deficient 2D images from the front, back, and top view in this example). A group 802-4 is illustrated as an ellipsis that will be understood to represent any suitable number of additional 2D images that are tailored to any suitable number of other components 404 of 3D object 400. For example, within group 802-4, 2D images tailored to the head, right arm, legs, and feet of the human body object 400 may be incorporated.

In certain examples, 2D atlas image 800 may implement a volumetric 2D representation of human body object 400 in the sense that all of the 2D images corresponding to the components 402 and 404 or human body object 400 may be included within 2D atlas image 800. In such examples, system 100 may identify a plurality of components of 3D object 400, generate respective sets of 2D images depicting the different components of 3D object 400 from respective sets of vantage points tailored to the different components (i.e., sets of vantage points different from the vantage points of the set of vantage points 408 tailored to hand component 402), and incorporate one or more 2D images of the other respective sets of 2D images within 2D atlas image 800. In other examples, 2D images tailored to different components could be separated onto several different 2D atlas images that combined would provide a full volumetric 2D representation of the 3D object.

In certain implementations, 2D atlas image 800 may not only implement a volumetric 2D representation of one 3D object (e.g., human body object 400), but may additionally incorporate sufficient 2D images to serve as a volumetric 2D representation of one or more additional 3D objects (e.g., other 3D objects 304 described above). For example, group 802-5 is shown to include a plurality of 2D images 808 that will be understood to depict one or more components of a 3D object 304 that is different from 3D object 400. Moreover, additional 2D images represented by an ellipsis in group 802-6 will be understood to depict one or more components of one or more additional 3D objects as may serve a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
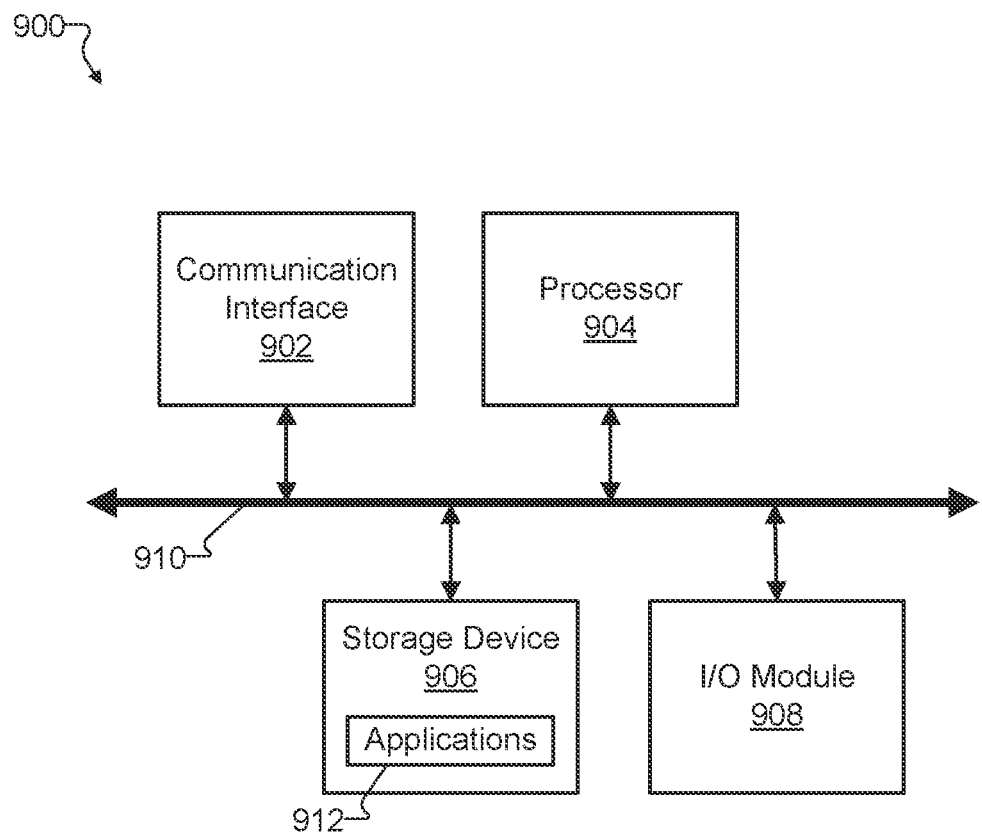
FIG. 9 shows an illustrative computing device according to embodiments described herein.

FIG. 9 shows an illustrative computing device 900 that may be specifically configured to perform one or more of the processes described herein. For example, computing system 900 may include or implement (or partially implement) an image processing system such as system 100 or any component included therein or system associated therewith. For example, computing system 900 may include or implement control or communications elements of certain capture devices such as capture devices 306, a scene capture system such as scene capture system 308, a machine learning system such as described in relation to machine learning model 320, a volumetric rendering device such as media player device 314, or any other computing systems or devices described herein.

As shown in FIG. 9, computing system 900 may include a communication interface 902, a processor 904, a storage device 906, and an input/output (I/O) module 908 communicatively connected via a communication infrastructure 910. While an illustrative computing system 900 is shown in FIG. 9, the components illustrated in FIG. 9 are not intended to be limiting. Additional or alternative components may be used in other embodiments. Components of computing system 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   identifying, by an image processing system, a first component of a three-dimensional (3D) object that is to be presented to a user, the first component of the 3D object distinguishable from one or more other components of the 3D object;
   generating, by the image processing system, a first set of two-dimensional (2D) images depicting the first component of the 3D object from a first set of vantage points tailored to the first component by corresponding to faces of a virtual bounding box encapsulating the first component;
   identifying, by the image processing system from among the first set of 2D images, a particular 2D image depicting the first component from a particular vantage point located internally within the 3D object;
   incorporating, by the image processing system within a 2D atlas image associated with the 3D object, each of the first set of 2D images except the particular 2D image identified as depicting the first component from the particular vantage point located internally within the 3D object; and
   providing, by the image processing system, the 2D atlas image to a volumetric rendering device configured to render, based on the 2D atlas image, a volumetric representation of the 3D object for presentation to the user.

2. The method of claim 1, further comprising:
   identifying, by the image processing system, a second component of the 3D object included among the one or more other components of the 3D object;
   generating, by the image processing system, a second set of 2D images depicting the second component of the 3D object from a second set of vantage points tailored to the second component and different from the first set of vantage points; and
   incorporating, by the image processing system within the 2D atlas image associated with the 3D object, one or more 2D images of the second set of 2D images.

3. The method of claim 1, wherein the first set of 2D images includes:
   color data images depicting the first component from each of the first set of vantage points; and
   depth data images depicting the first component from each of the first set of vantage points.

4. The method of claim 1, further comprising:
   accessing, by the image processing system, a representation of a scene that includes a plurality of 3D objects including the 3D object; and
   identifying, by the image processing system within the representation of the scene, the 3D object as being of a recognized object type;
   wherein the identifying of the first component of the 3D object is based on the identifying of the 3D object as being of the recognized object type.

5. The method of claim 4, further comprising obtaining, by the image processing system in response to the identifying of the 3D object as being of the recognized object type, a machine learning model associated with the recognized object type;
   wherein the identifying of the first component of the 3D object based on the identifying of the 3D object as being of the recognized object type is performed by identifying the first component of the 3D object based on the machine learning model obtained in response to the identifying of the 3D object as being of the recognized object type.

6. The method of claim 1, wherein the generating of the first set of 2D images includes filtering out, based on the identifying of the first component, content other than the first component from each 2D image of the first set of 2D images.

7. The method of claim 1, wherein the virtual bounding box dynamically changes to continuously encapsulate the first component such that the vantage points of the first set of vantage points are dynamic vantage points configured to remain tailored to the first component as the first component changes with respect to attributes including: a size attribute, an aspect ratio attribute, a position attribute, and an orientation attribute.

8. The method of claim 1, wherein:
   the first set of vantage points are orthographic vantage points; and
   the first set of 2D images are generated to orthographically depict the first component of the 3D object.

9. The method of claim 1, wherein the volumetric rendering device is a media player device used by the user and configured to present the volumetric representation of the 3D object to the user.

10. A system comprising:
    a memory storing instructions; and
    a processor communicatively coupled to the memory and configured to execute the instructions to:
      identify a first component of a three-dimensional (3D) object that is to be presented to a user, the first component of the 3D object distinguishable from one or more other components of the 3D object;
      generate a first set of two-dimensional (2D) images depicting the first component of the 3D object from a first set of vantage points tailored to the first component by corresponding to faces of a virtual bounding box encapsulating the first component;
      identify, from among the first set of 2D images, a particular 2D image depicting the first component from a particular vantage point located internally within the 3D object;
      incorporate, within a 2D atlas image associated with the 3D object, each of the first set of 2D images except the particular 2D image identified as depicting the first component from the particular vantage point located internally within the 3D object; and
      provide the 2D atlas image to a volumetric rendering device configured to render, based on the 2D atlas image, a volumetric representation of the 3D object for presentation to the user.

11. The system of claim 10, wherein the processor is further configured to execute the instructions to:
    identify a second component of the 3D object included among the one or more other components of the 3D object;
    generate a second set of 2D images depicting the second component of the 3D object from a second set of vantage points tailored to the second component and different from the first set of vantage points; and
    incorporate, within the 2D atlas image associated with the 3D object, one or more 2D images of the second set of 2D images.

12. The system of claim 10, wherein the first set of 2D images includes:
   color data images depicting the first component from each of the first set of vantage points; and
   depth data images depicting the first component from each of the first set of vantage points.

13. The system of claim 10, wherein:
   the processor is further configured to execute the instructions to:
      access a representation of a scene that includes a plurality of 3D objects including the 3D object, and
      identify, within the representation of the scene, the 3D object as being of a recognized object type; and
   the identifying of the first component of the 3D object is based on the identifying of the 3D object as being of the recognized object type.

14. The system of claim 13, wherein:
   the processor is further configured to execute the instructions to obtain, in response to the identifying of the 3D object as being of the recognized object type, a machine learning model associated with the recognized object type; and
   the identifying of the first component of the 3D object based on the identifying of the 3D object as being of the recognized object type is performed by identifying the first component of the 3D object based on the machine learning model obtained in response to the identifying of the 3D object as being of the recognized object type.

15. The system of claim 10, wherein the generating of the first set of 2D images includes filtering out, based on the identifying of the first component, content other than the first component from each 2D image of the first set of 2D images.

16. The system of claim 10, wherein the virtual bounding box dynamically changes to continuously encapsulate the first component such that the vantage points of the first set of vantage points are dynamic vantage points configured to remain tailored to the first component as the first component changes with respect to attributes including: a size attribute, an aspect ratio attribute, a position attribute, and an orientation attribute.

17. The system of claim 10, wherein:
   the first set of vantage points are orthographic vantage points; and
   the first set of 2D images are generated to orthographically depict the first component of the 3D object.

18. The system of claim 10, wherein the volumetric rendering device is a media player device used by the user and configured to present the volumetric representation of the 3D object to the user.

19. A non-transitory computer-readable medium storing instructions that, when executed, direct a processor of a computing device to:
   identify a first component of a three-dimensional (3D) object that is to be presented to a user, the first component of the 3D object distinguishable from one or more other components of the 3D object;
   generate a first set of two-dimensional (2D) images depicting the first component of the 3D object from a first set of vantage points tailored to the first component by corresponding to faces of a virtual bounding box encapsulating the first component;
   identify, from among the first set of 2D images, a particular 2D image depicting the first component from a particular vantage point located internally within the 3D object;
   incorporate, within a 2D atlas image associated with the 3D object, each of the first set of 2D images except the particular 2D image identified as depicting the first component from the particular vantage point located internally within the 3D object; and
   provide the 2D atlas image to a volumetric rendering device configured to render, based on the 2D atlas image, a volumetric representation of the 3D object for presentation to the user.

20. The computer-readable medium of claim 19, wherein the virtual bounding box dynamically changes to continuously encapsulate the first component such that the vantage points of the first set of vantage points are dynamic vantage points configured to remain tailored to the first component as the first component changes with respect to attributes including: a size attribute, an aspect ratio attribute, a position attribute, and an orientation attribute.

* * * * *